US012589779B2

(12) United States Patent
Humann et al.

(10) Patent No.: US 12,589,779 B2
(45) Date of Patent: Mar. 31, 2026

(54) LIGHTING TRACK FOR AUTORACKS AND METHODS OF UPGRADING AUTORACKS

(71) Applicant: International Name Plate Supplies Ltd., London (CA)

(72) Inventors: David Humann, London (CA); Thomas Freeman, London (CA); Ethan Gagie, London (CA)

(73) Assignee: International Name Plate Supplies Ltd., London (CA)

( * ) Notice: Subject to any disclaimer, the term of this patent is extended or adjusted under 35 U.S.C. 154(b) by 0 days.

(21) Appl. No.: 19/207,557

(22) Filed: May 14, 2025

(65) Prior Publication Data

US 2025/0360951 A1 Nov. 27, 2025

(30) Foreign Application Priority Data

May 23, 2024 (CA) ................................ CA 3239428

(51) Int. Cl.

| | |
|---|---|
| ***B61D 29/00*** | (2006.01) |
| ***F21S 4/28*** | (2016.01) |
| ***F21V 15/01*** | (2006.01) |
| ***F21V 23/00*** | (2015.01) |
| ***F21V 23/02*** | (2006.01) |
| ***F21W 106/00*** | (2018.01) |
| ***F21Y 103/10*** | (2016.01) |
| ***F21Y 115/10*** | (2016.01) |

(52) U.S. Cl.

CPC ................ *B61D 29/00* (2013.01); *F21S 4/28* (2016.01); *F21V 15/01* (2013.01); *F21V 23/002* (2013.01); *F21V 23/02* (2013.01); *F21W 2106/00* (2018.01); *F21Y 2103/10* (2016.08); *F21Y 2115/10* (2016.08)

(58) Field of Classification Search

CPC . B61D 29/00; F21S 4/28; F21V 15/01; F21V 23/002; F21V 23/02

See application file for complete search history.

(56) References Cited

U.S. PATENT DOCUMENTS

| | | | | | |
|---|---|---|---|---|---|
| 4,172,612 | A * | 10/1979 | Kinard | B60P 3/08 | 410/29.1 |
| 4,668,142 | A * | 5/1987 | Fity | B60P 3/08 | 410/29.1 |
| 4,750,856 | A * | 6/1988 | Lapiolahti | B60P 3/07 | 414/478 |

(Continued)

*Primary Examiner* — Bryon T Gyllstrom

(74) *Attorney, Agent, or Firm* — Murphy, Bilak & Homiller, PLLC

(57) ABSTRACT

An elongated lighting track for attachment to a deck floor of an autorack. The lighting track has multiple track segments, each having a rigid elongated base track to receive and attach to an elongated lighting device and be attached to the deck floor. The lighting device has multiple lights and an integrated power bus. The light track also has a translucent cover configured to cover the elongated lighting device. The lighting device is attached to the base track, and the cover is positioned over the lighting device and attached to the base track. The track segments are attached to the deck floor to form the lighting track. The power busses of non-terminal track segments are electrically connected to the power busses of each of the two adjacent track segments, and terminal track segments are electrically connected to the adjacent track segment at the non-terminal end.

20 Claims, 9 Drawing Sheets

(56) References Cited

U.S. PATENT DOCUMENTS

| | | | | |
|---|---|---|---|---|
| 5,080,541 | A * | 1/1992 | Andre | B60P 3/08<br>410/27 |
| 6,177,868 | B1 * | 1/2001 | Hollingsworth | B60Q 9/00<br>180/41 |
| 9,789,799 | B2 * | 10/2017 | Pawluk | B60P 3/08 |
| 11,008,717 | B2 * | 5/2021 | Roy | B62D 33/02 |
| 2004/0228714 | A1 * | 11/2004 | Ceccarelli | B60P 3/12<br>414/563 |
| 2009/0200966 | A1 * | 8/2009 | Whitehouse | F21V 25/10<br>362/459 |
| 2016/0314688 | A1 * | 10/2016 | Beckham | F16M 13/02 |
| 2025/0010749 | A1 * | 1/2025 | Noh | B60L 53/52 |

* cited by examiner

LIGHTING TRACK FOR AUTORACKS AND METHODS OF UPGRADING AUTORACKS

BACKGROUND

Autoracks are railcars configured to transport vehicles, such as automobiles, via a railway (also referred to as a "railroad"). Autoracks generally have 1-3 decks, each of which can accommodate multiple vehicles. They generally have two metal vehicle trackways along the floor of each deck extending along the length of each deck of the autorack. Each trackway is proximate to one of the sides of the autorack and they are spaced apart to accommodate the left tires of a vehicle on one side and the right side tires of the vehicle on the other side. Tie down chocks are typically attached to the wheels of the vehicles in the autorack.

When autoracks are loaded or unloaded under limited lighting conditions it can be difficult for the crew to perform their duties, particularly with respect to wheel chocking. Outside floodlights are generally unsatisfactory. Using the headlights of vehicles in the autorack does not light areas such as the areas where wheel chocks are located. Lights on the ceiling of the autoracks are generally not optimal for similar reasons.

SUMMARY

Embodiments herein include a method of upgrading an autorack configured to transport vehicles. The autorack has left and right sides and wheels configured to engage with and travel along railway tracks. The autorack has one or more decks, each deck having a floor configured to support multiple vehicles. Each deck floor has a central longitudinal axis that is approximately parallel to the railway tracks and approximately equidistant from the left and right sides of the autorack. The method includes providing multiple elongated track segments and, for each track segment: providing a rigid elongated base track configured to receive an elongated lighting device; providing the elongated lighting device having multiple lights and an integrated power bus; providing a translucent cover configured to cover the lighting device; attaching the lighting device to the base track; and covering the lighting device with the cover and attaching the cover to the base track. The method further includes, for each deck, attaching the base tracks of the track segments to the deck floor along the longitudinal axis to form an elongated lighting track, electrically connecting the power busses of adjacent track segments to each other; and electrically connecting the power bus of at least one lighting device to a power source to illuminate the lights in each lighting device of the lighting track.

The lighting device preferably includes a printed circuit board (PCB) and wherein the lights are light-emitting diodes (LEDs).

The base track is preferably made of metal, which may be galvanized steel.

The lighting track preferably substantially extends along the length of the longitudinal axis of the autorack.

Each base track may have flat lower portions extending longitudinally along left and right sides of the base track and extending laterally towards the left and right sides of the autorack, the flat portions being configured to be attached to the deck floor of one of the decks of the autorack.

Each track segment has front and rear ends and further and may include front and rear caps attached to the front and rear ends respectively with openings configured to pass through electrical wires connected to the power bus of the track segment to connect the power bus to the power bus of an adjacent track segment.

The adjacent ends of each pair of adjacent track segments are preferably connected together and attached to the deck floor by a track connector that covers the electrical wires extending between the adjacent track segments.

Each terminal track segment, being a track segment having one end, being the terminal end, not adjacent to another track segment, the terminal end of the terminal track segment may be covered by a terminal track connector that is attached to the deck floor.

The cover may be made of polycarbonate material.

The autorack may have at least two decks or exactly one deck.

Embodiments herein also include an elongated lighting track for attachment to a deck floor of an autorack along a longitudinal axis of the deck floor. The lighting track has multiple elongated track segments. Each track segment has a rigid elongated base track configured to receive and attach to an elongated lighting device and configured to be attached to the deck floor. The lighting device has multiple lights and an integrated power bus. The light track also has a translucent cover configured to cover the elongated lighting device. The lighting device is attached to the base track, and the cover is positioned over the lighting device and attached to the base track. The track segments are attached to the deck floor along the longitudinal axis of the deck floor to form the lighting track. The power busses of non-terminal track segments, being track segments that are adjacent to two other track segments, are electrically connected to the power busses of each of the two adjacent track segments, and terminal track segments, being track segments each having a terminal end that is not adjacent to another track segment and a non-terminal end that is adjacent to another track segment, are electrically connected to the adjacent track segment at the non-terminal end. The lighting device preferably includes a printed circuit board (PCB) and wherein the lights are light-emitting diodes (LEDs). The base track may be made of galvanized steel. The elongated lighting track preferably substantially extends along the length of the longitudinal axis of the autorack. Each base track may include flat lower portions extending longitudinally along left and right sides of the base track and extending laterally towards the left and right sides of the autorack, the flat portions being configured to be attached to the deck floor of one of the decks of the autorack. Each track segment front and rear ends and may have front and rear caps attached to the front and rear ends respectively with openings configured to pass through electrical wires connected to the power bus of the track segment to connect the power bus to the power bus of an adjacent track segment. The adjacent ends of each pair of adjacent track segments are preferably connected together and attached to the deck floor by a track connector that covers the electrical wires extending between the adjacent track segments. For each terminal track segment, being a track segment having one end, being the terminal end, not adjacent to another track segment, the terminal end of the terminal track segment may be covered by a terminal track connector that is attached to the deck floor.

DETAILED DESCRIPTION

Embodiments disclosed herein include a modular autorack lighting track 200 having multiple elongated track segments 400, and a method for upgrading an autorack railcar by attaching such lighting tracks 200 to the floor(s) of the deck(s) of an autorack. The lighting track preferably provides adequate lighting for employees to work (such as at least 1 foot candle of light) at the areas where wheel chocks are installed and removed. It provides lighting for vehicle inspection and is non-intrusive for loading/unloading personnel. It is preferably low voltage (e.g. 24V) within the vehicle bodies.

Figure 1:
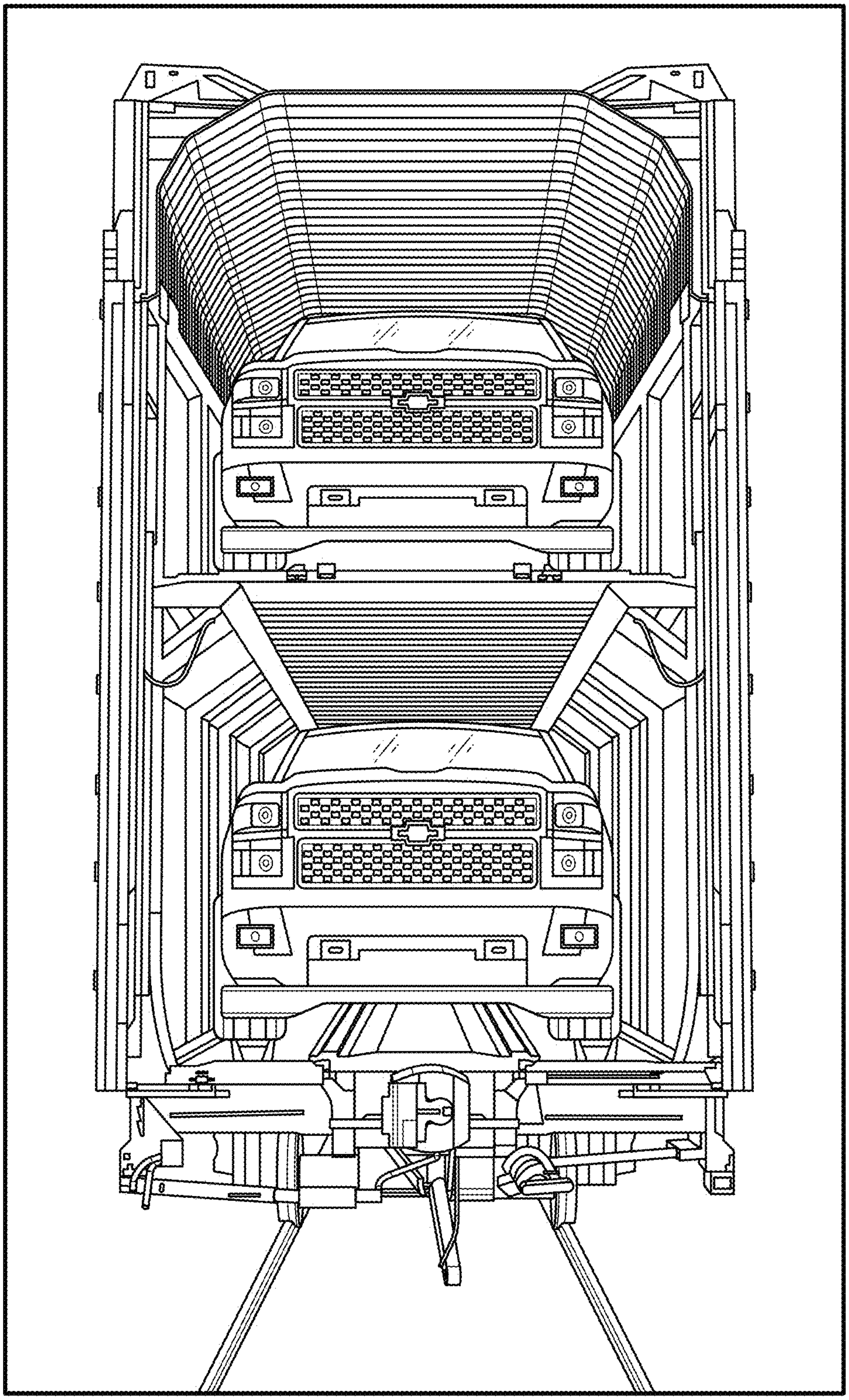
FIG. 1 Prior Art
FIG. 1 is a rear view of a prior art bi-level enclosed autorack loaded with vehicles.

FIG. 1 shows an example of prior art autorack loaded with cars.

Figure 2:
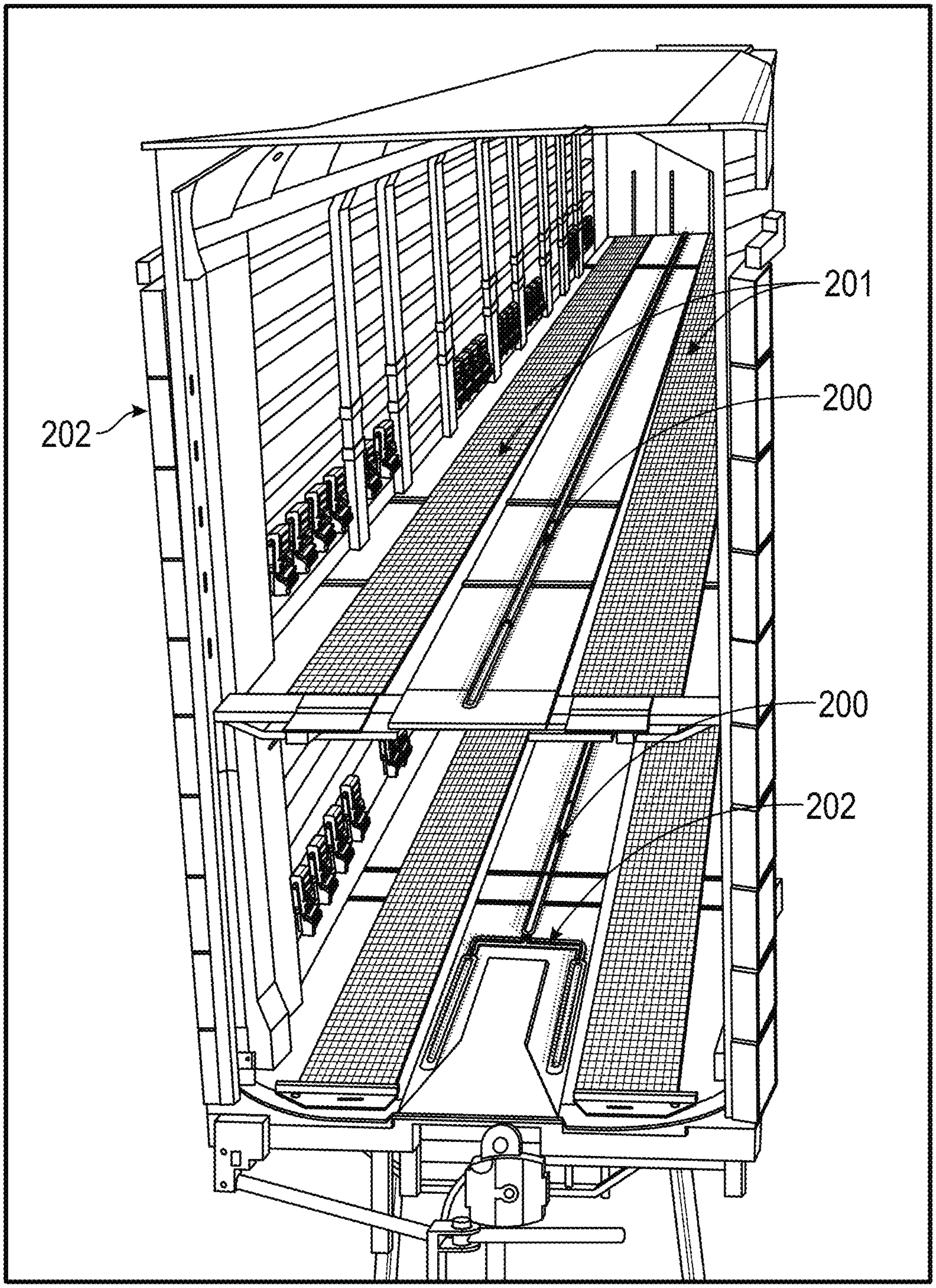
FIG. 2 is a rear perspective view of a bilevel autorack having two decks with a lighting track attached to the floor of each deck.

FIG. 2 is a rear view of a bi-level autorack 202 with upper and lower decks with an elongated lighting track 200 attached to the floor of each of the two decks. Vehicle trackways 201 on which vehicle tires rest are also shown.

Figure 3:
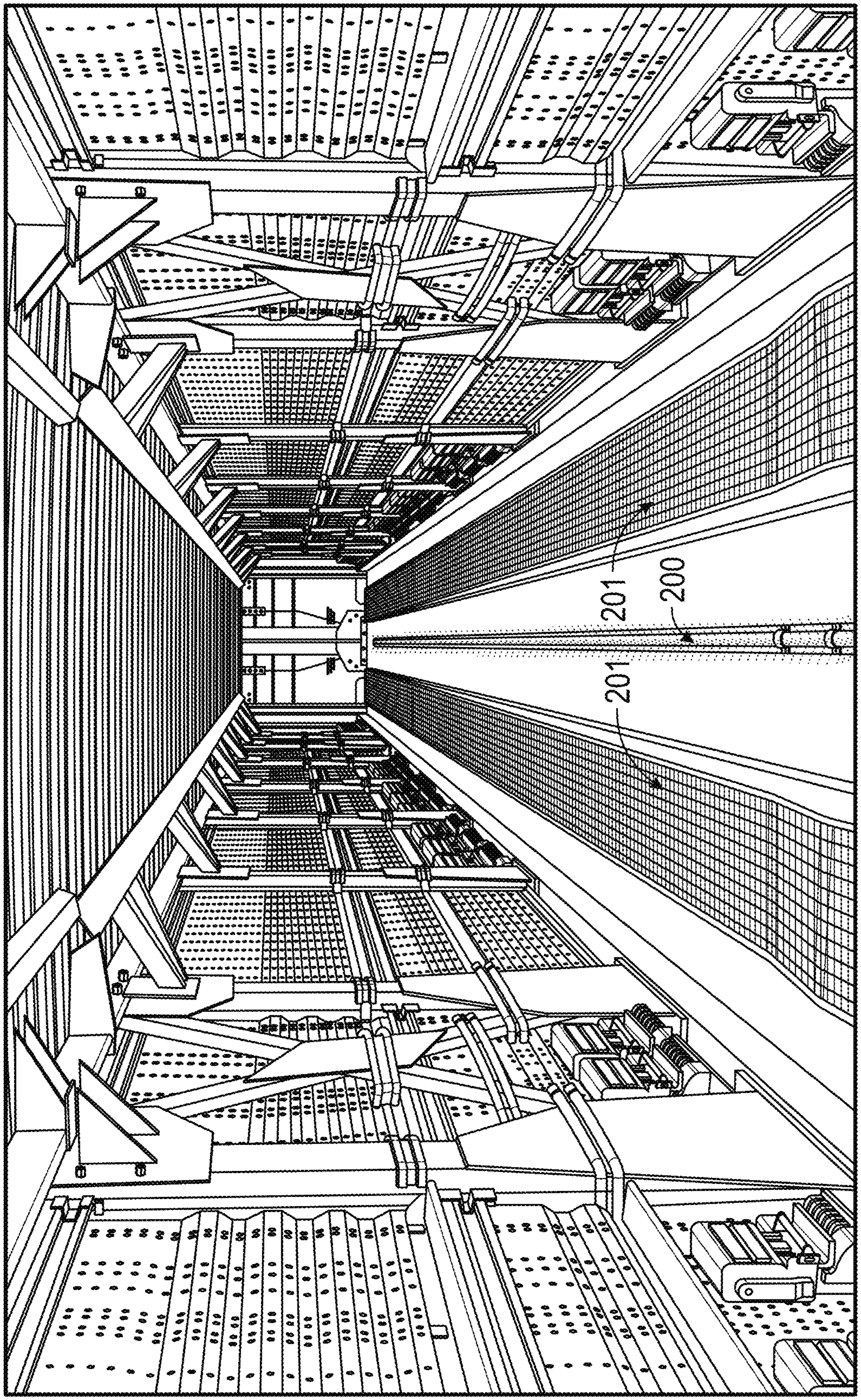
FIG. 3 is an interior view of an autorack deck with a lighting track attached to the deck floor.

Each lighting track 200 preferably extends along the length, or a substantial portion, of the central longitudinal axis of one deck of the autorack as shown in FIGS. 2 and 3. As used herein, "longitudinal axis" refers to a notional line equidistant from the left and right sides of the autorack going from one end (front or rear) of the autorack to the other end of the autorack. For example, the lighting track 200*a* attached to the upper deck of the autorack as shown in FIG. 2 substantially extends along the full length of the longitudinal axis of the autorack. By extending along the length, or a substantial portion, of the central longitudinal axis of one deck of the autorack, it is not necessarily meant, and is not essential, that the light track be coincident with the longitudinal axis. For example it may be displaced to the left or right of the axis, although this is not preferred.

The lighting track 200 is substantially parallel to straight portions of the railway tracks on which the autorack is positioned, and approximately equidistant from the left and right sides of the autorack. In this context, "approximately equidistant" means that the lighting track is always in the central portion of the deck floor, spaced apart from the vehicle trackways. The "sides" of the autorack refer to the left and right sides of the floors of the decks of the auto racks. The autorack may or may not have vertical physical walls corresponding to each side of the autorack.

Figure 4:
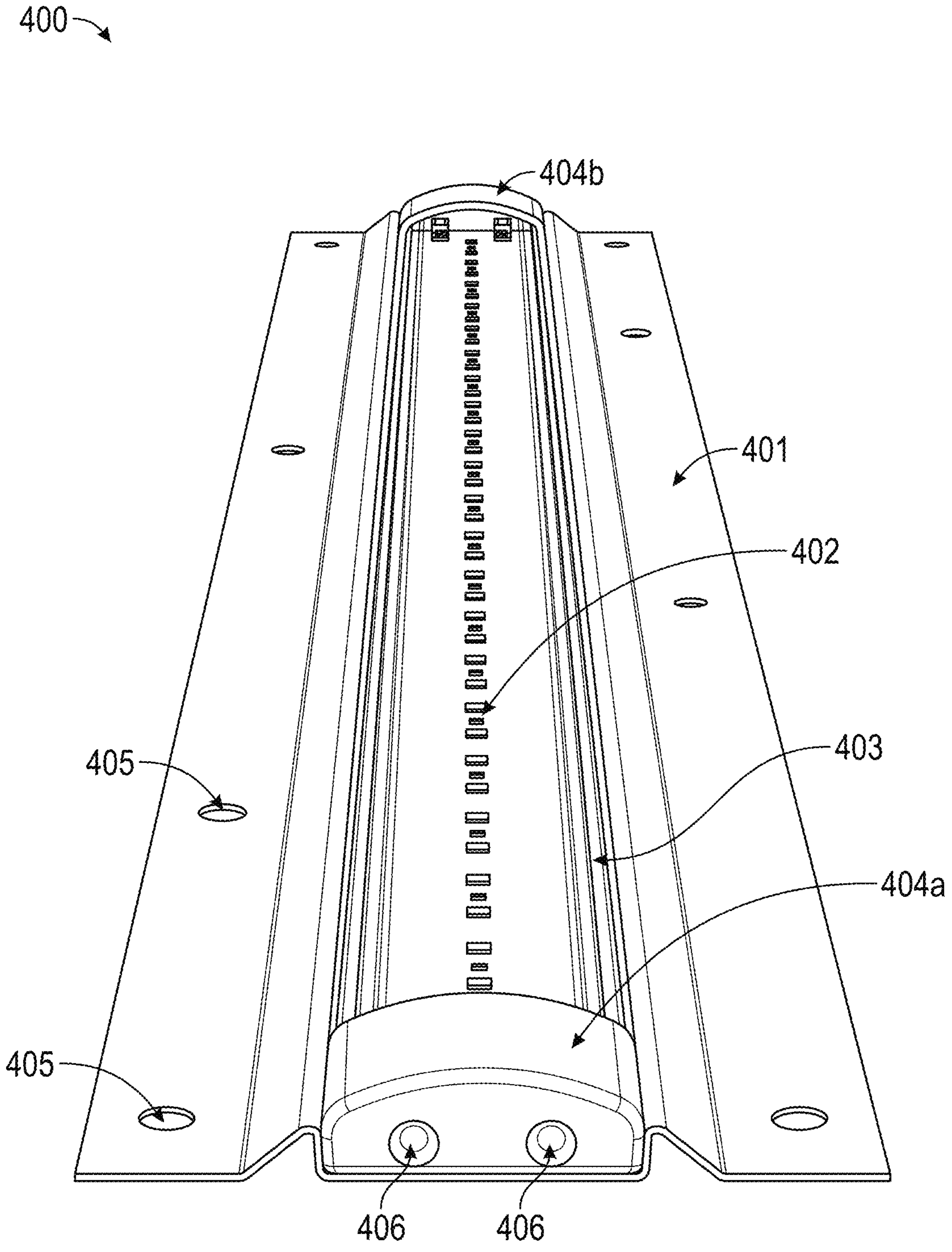
FIG. 4 shows an assembled track segment in isolation, showing the base track, lighting device, cover and end caps.
Figure 5:
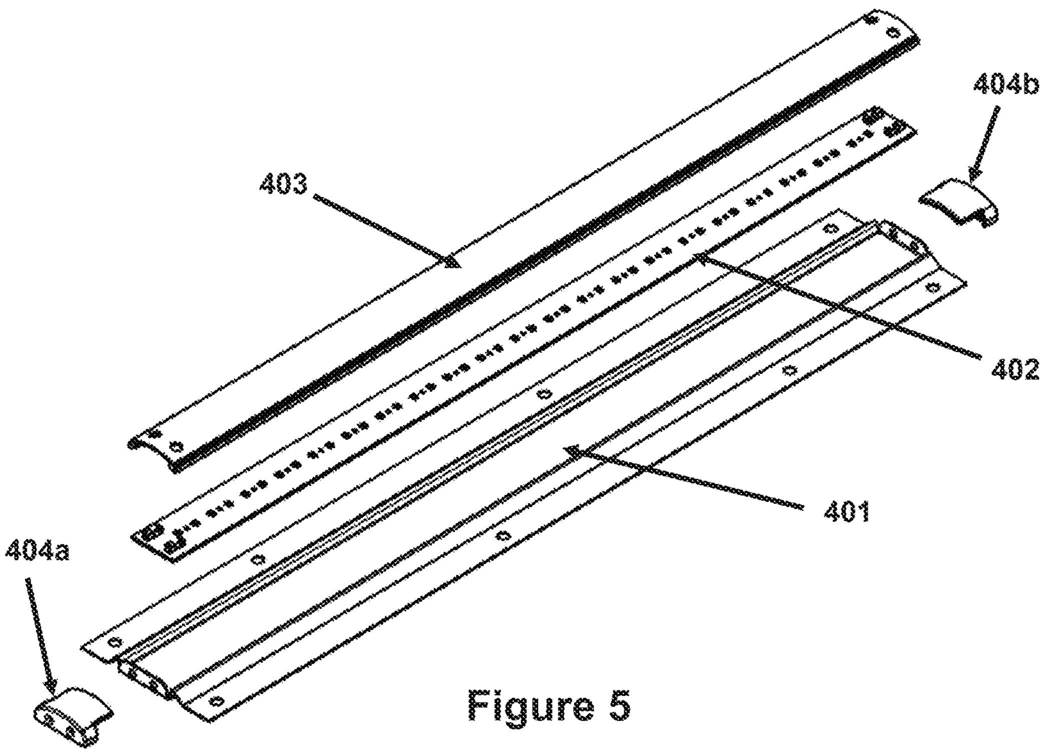
FIG. 5 is an exploded view of the track segment of FIG. 4.
Figure 8:
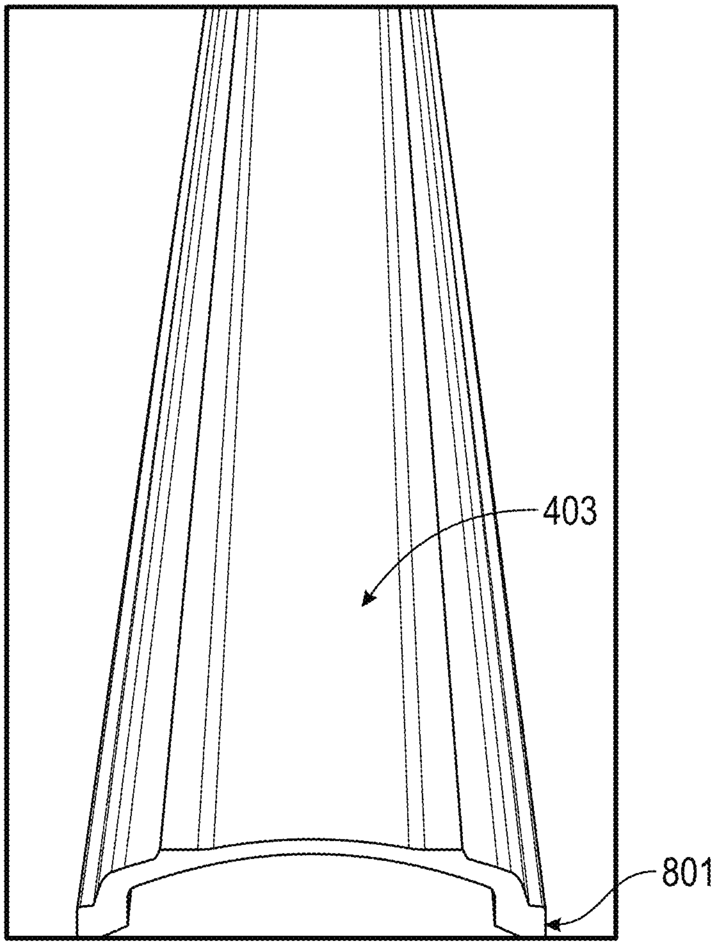
FIG. 8 shows the translucent cover of the track segment of FIG. 4 in isolation.
Figure 9:
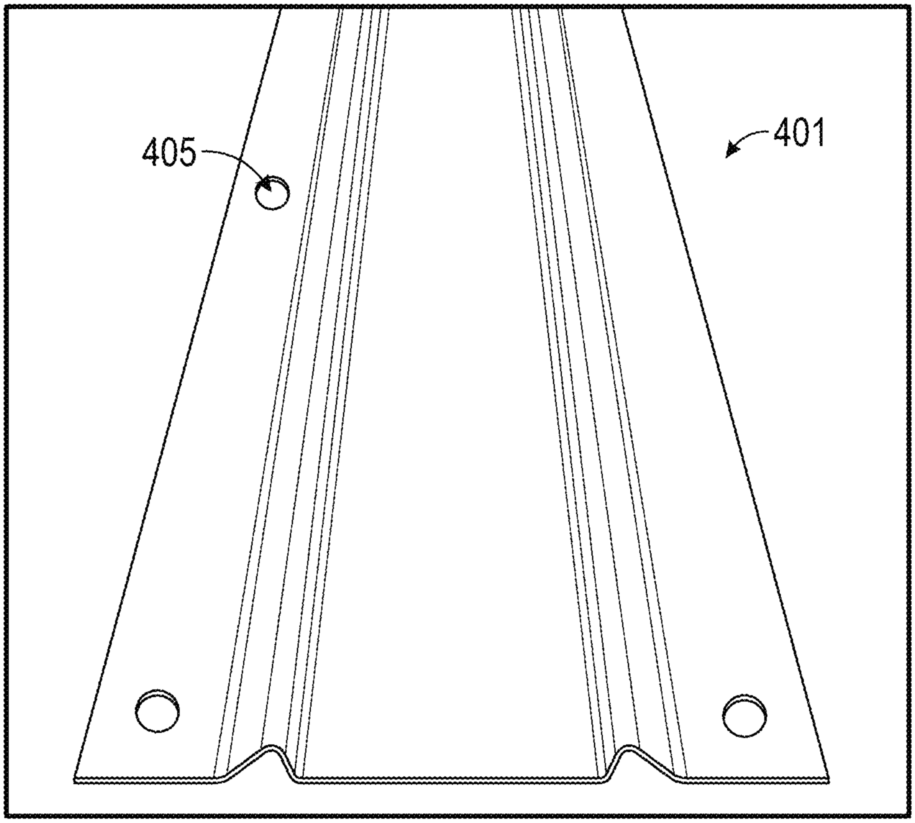
FIG. 9 shows the base track of the track segment of FIG. 4 in isolation.

The lighting track 200 preferably is formed from multiple elongated track segments 400 placed end to end and attached to the deck floor to form the lighting track 200. FIG. 4 shows a single track segment 400 in isolation and FIG. 5 shows an exploded view of the same track segment 400. Each track segment 400 includes a base track 401 that is an elongated rigid piece configured to receive an elongated lighting device 402, which is positioned in the central portion of the base track 401, and shown in an exploded view in FIG. 6. The base track 401 is preferably made of metal which is typically galvanized steel, e.g. 22 gauge, but other material may be used, as would be recognized by skilled persons. The lighting device 402 is covered by a translucent cover 403, which may be transparent, that acts as a light-transmitting window that is preferably made of polycarbonate material, but other translucent/transparent materials may be used. The term "translucent" as used herein includes "transparent". The cover 403 is adhesively attached to the base track 401 via flanges 801, as shown in FIG. 8, the flanges extending laterally a short distance from the lower ends of the cover 403 towards the sides of the autorack. The cover 403 is preferably resistant to ultraviolet radiation, impacts, crush, abrasions, water, oil and chemicals.

Each track segment 400 preferably has front and rear caps 404*a*, 404*b* attached to the front and rear ends of the track segment 400 respectively. Each cap 404 has openings 406 though which electrical wires connected to the power bus of the track segment 400 extend to facilitate electrical connection to other track segments adjacent to the front and rear of the track segment 400. Such power facilitates illumination of the lights in each lighting device 402.

A track segment's base track 401 has a flat lower surface and is configured to be attached to a deck floor of an autorack parallel to the longitudinal axis of the autorack by welding using fasteners, such as rivets such as Holden deck rivets p/n GLC 2002 or Trinity p/n 164-38344-15, that extend through multiple openings 405 in the flat bottomed left and right sides of the base track 401. Other methods of attachment are also possible, such as welding the base track to the deck floor. Multiple track segments 400 are positioned end-to-end parallel to straight portions of the railway tracks and parallel to the longitudinal axis of the autorack along the floor of each deck of the autorack so that the track segments form an elongated lighting track 200. It is preferred that the lighting track 200 substantially extends along the length of the longitudinal axis of the deck, although this is not essential as long as the lighting track extends along a sufficiently long portion of the longitudinal axis of the deck so that it provides sufficient light to support chocking and de-choking of all the tires of vehicles when the deck is fully loaded with vehicles.

Figure 6:
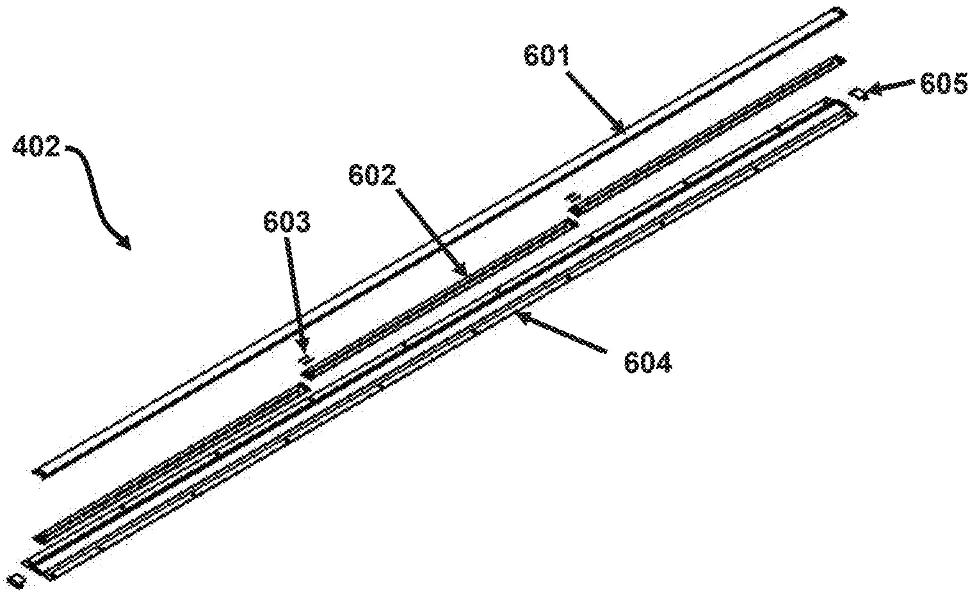
FIG. 6 is an exploded view of the lighting device of FIG. 4.

FIG. 6 is an exploded view of the lighting device 402 of FIGS. 4 and 5. The lighting device 402 comprises a galvanized steel track 604, in which high amperage LED strips 602 are placed, the LED strips 602 being electrically connected by copper connectors 603. The LED strips 602 are covered by a polycarbonate protective lens 601. Watertight Silicone end caps 605 are attached to each end of the lighting device 402.

Figure 7:
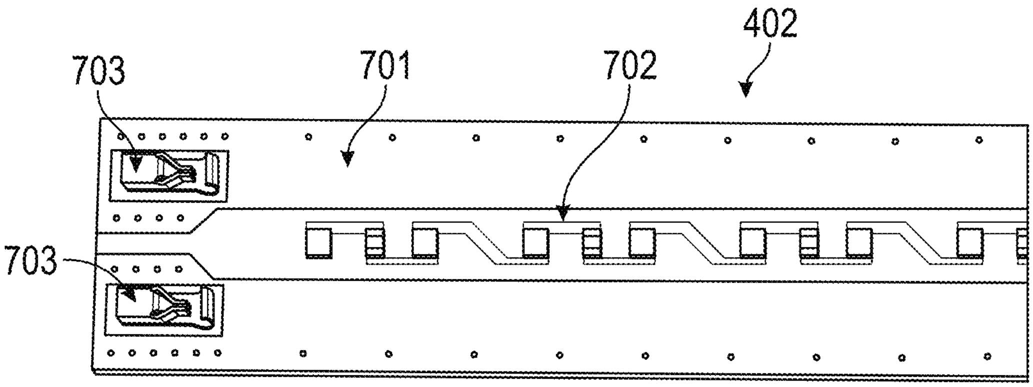
FIG. 7 shows the lighting device of FIG. 4 in isolation.
Figure 10:
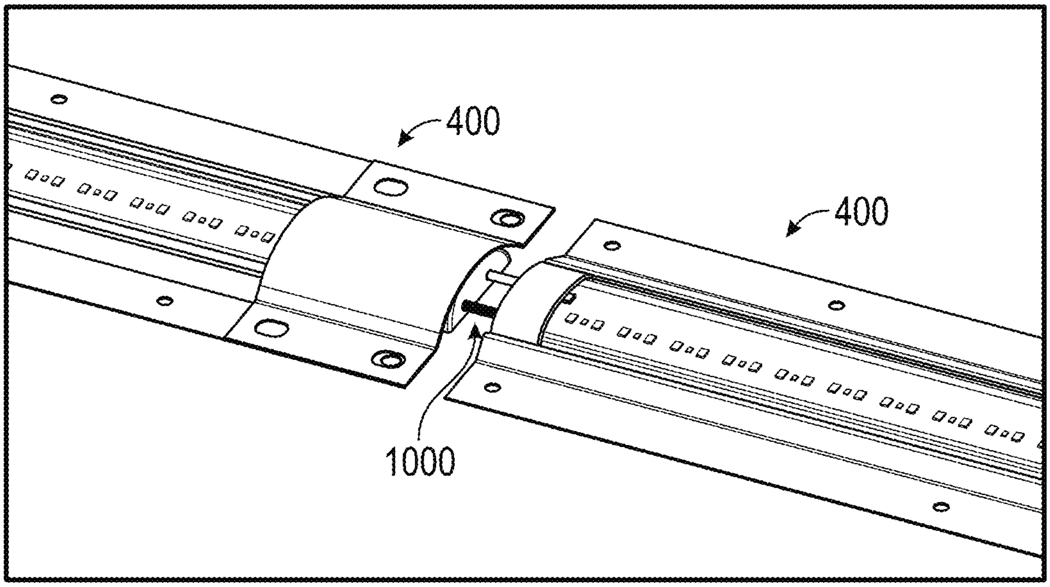
FIG. 10 shows the electrical connection between two adjacent track segments.

FIG. 7 shows the lighting device of 402 FIG. 4 in isolation sowing the LED board 701 with attached LEDs 702 and electric connectors 703 for electrically connecting the power busses of adjacent track segments 400 by wires, such as 12 AWG wire, extending though the openings 406 in the end caps 404. FIG. 10 shows the electrical connection 1000 between two adjacent track segments.

Figure 11A:
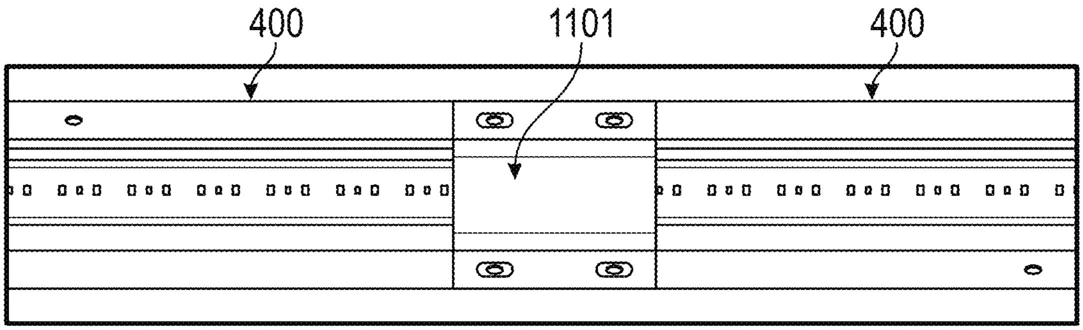
FIGS. 11A-C each show two connected track segments with three types of track connectors covering the electrical connections between the segments and securing the segments to each other.
Figure 11B:
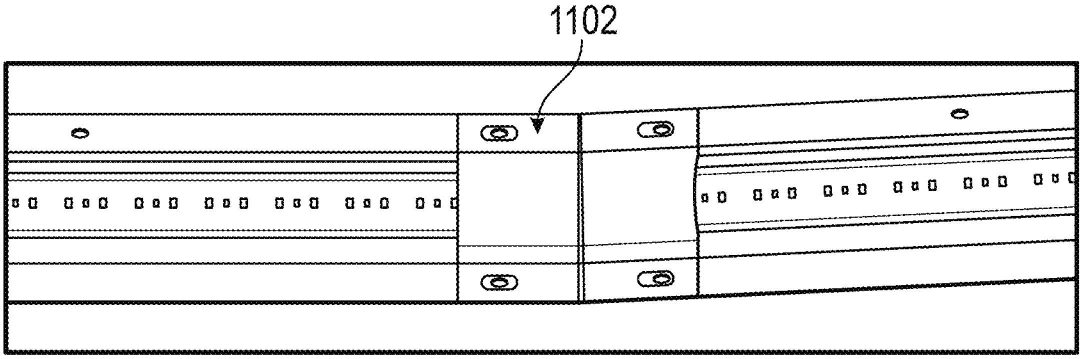
Figure 11C:
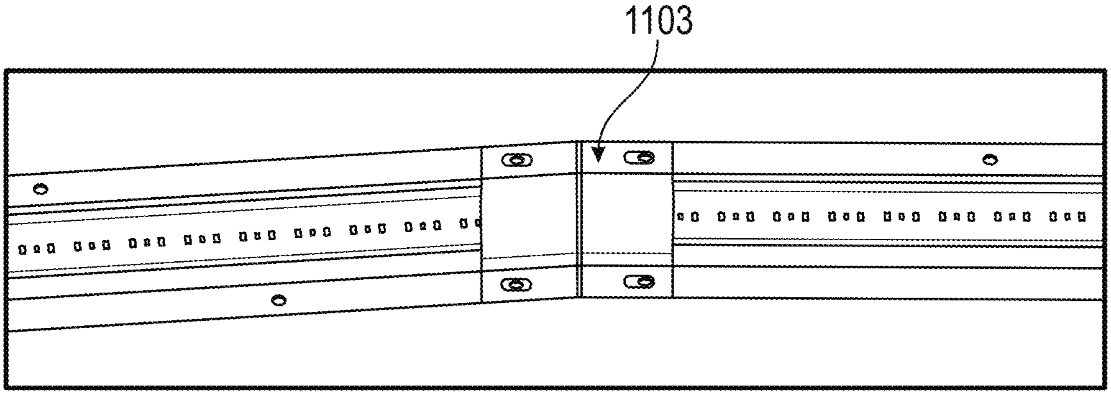
Figure 12:
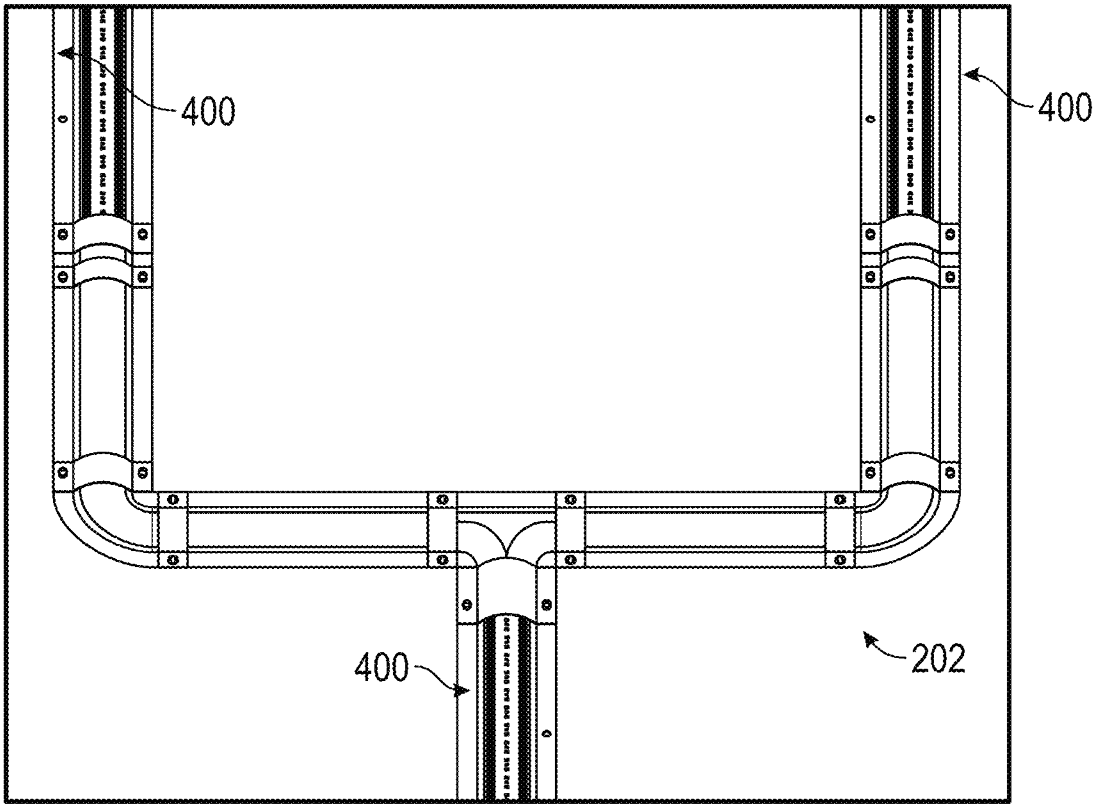
FIG. 12 shows a steel tongue that splits the lighting track to facilitate viewing the chocking areas on both sides of the tongue by connecting one terminal segment to each side of the tongue.

Adjacent track segments 400 are secured together and to the deck floor by track connectors 1101, 1102 and 1103 as shown in FIGS. 11A, 11B and 11C. The track connectors cover and protect the electrical wires connecting the segments 400 and have openings that align with openings 405 in the segments 400 so that the connectors and ends of the segments 400 can be securely attached to the deck floor, for example by rivets.

Track segments 400 may vary in length, such as 23", 45.5", 58" and 105.5", so that the optimal lighting track length can be achieved. The LED strips may be 22.5" or 35" long.

FIG. 11A shows a straight track connector 1101 for connecting two segments 400 that are secured the deck floor. FIGS. 11B and 11C should connectors 1102, 1003 where the segments 400 meet at an angle, for example 4.75° in FIG. 11B and 175.25° in FIG. 11C.

Figure 13:
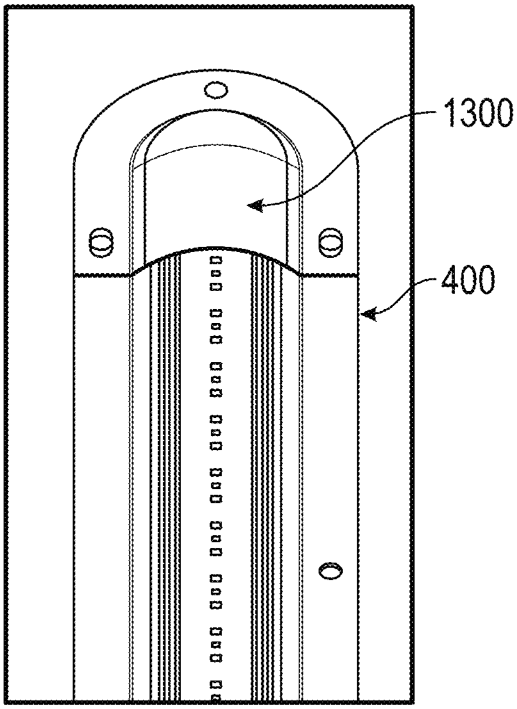
FIG. 13 shows a terminal track connector that secures the terminal track segments in a lighting track to the deck floor.

For each terminal track segment, one end (the "terminal end") of which is not adjacent to another track segment, the terminal end is preferably covered by a terminal track connector 1300 as shown in FIG. 13 that is attached to the deck floor.

The lighting device 402 of each track segment 400 has multiple lights, preferably light-emitting diodes (LEDs), and a printed circuit board (PCB) 701 with an integrated power bus. The power bus of a lighting device is connected to a power source configured to light the plurality of lights in the lighting device.

Preferably, the ends of the lighting track on the lowest level (the "A" deck) are terminated by a steel tongue 202 that splits the lighting track to facilitate viewing the chocking areas on both sides of the tongue by connecting one terminal segment 400 to each side of the tongue 202.

What is claimed is:

1. A method of upgrading an autorack configured to transport vehicles, the autorack having left and right sides and wheels configured to engage with and travel along railway tracks, the autorack having one or more decks, each deck having a floor configured to support a plurality of vehicles, each deck floor having a central longitudinal axis having a length and being approximately parallel to the railway tracks and approximately equidistant from the left and right sides of the autorack, the method comprising:

- a. providing a plurality of elongated track segments comprising, for each track segment:
  - i. providing a rigid elongated base track configured to receive an elongated lighting device;
  - ii. providing the elongated lighting device comprising a plurality of lights and an integrated power bus;
  - iii. providing a translucent cover configured to cover the lighting device;
  - iv. attaching the lighting device to the base track; and
  - v. covering the lighting device with the cover and attaching the cover to the base track;
- b. for each deck, attaching a plurality of the base tracks of the track segments to the deck floor along the longitudinal axis to form an elongated lighting track;
- c. electrically connecting the power busses of adjacent track segments to each other; and
- d. electrically connecting the power bus of at least one lighting device to a power source to illuminate the lights in each lighting device of the lighting track.

2. The method of claim 1, wherein the lighting device comprises a printed circuit board (PCB) and wherein the lights are light-emitting diodes (LEDs).

3. The method of claim 1, wherein the base track is made of metal.

4. The method of claim 3, wherein the metal is galvanized steel.

5. The method of claim 1, wherein the lighting track substantially extends along the length of the longitudinal axis of the autorack.

6. The method of claim 1, wherein each base track comprises flat lower portions extending longitudinally along left and right sides of the base track and extending laterally towards the left and right sides of the autorack, the flat portions being configured to be attached to the deck floor of one of the decks of the autorack.

7. The method of claim 1, wherein each track segment has front and rear ends and further comprises front and rear caps attached to the front and rear ends respectively with openings configured to pass through electrical wires connected to the power bus of the track segment to connect the power bus to the power bus of an adjacent track segment.

8. The method of claim 1, wherein the adjacent ends of each pair of adjacent track segments are connected together and attached to the deck floor by a track connector that covers the electrical wires extending between the adjacent track segments.

9. The method of claim 1, wherein, for each terminal track segment, being a track segment having one end, being the terminal end, not adjacent to another track segment, the terminal end of the terminal track segment is covered by a terminal track connector that is attached to the deck floor.

10. The method of claim 1, wherein the cover is made of polycarbonate material.

11. The method of claim 1, wherein the autorack has at least two decks.

12. The method of claim 1, wherein the autorack has exactly one deck.

13. An elongated lighting track for attachment to a deck floor of an autorack along a longitudinal axis of the deck floor, the lighting track comprising a plurality of elongated track segments, each track segment comprising:

- a rigid elongated base track configured to receive and attach to an elongated lighting device and configured to be attached to the deck floor;
- the lighting device comprising a plurality of lights and an integrated power bus; and
- a translucent cover configured to cover the elongated lighting device,
- wherein the lighting device is attached to the base track, and the cover is positioned over the lighting device and attached to the base track, and
- wherein the track segments are configured to be attached to the deck floor along the longitudinal axis of the deck floor to form the lighting track, and
- wherein the power busses of non-terminal track segments, being track segments that are adjacent to two other track segments, are configured to be electrically connected to the power busses of each of the two adjacent track segments, and terminal track segments, being track segments each having a terminal end that is not adjacent to another track segment and a non-terminal end that is adjacent to another track segment, are configured to be electrically connected to the adjacent track segment at the non-terminal end.

14. The elongated lighting track of claim 13, wherein the lighting device comprises a printed circuit board (PCB) and wherein the lights are light-emitting diodes (LEDs).

15. The elongated lighting track of claim 13, wherein the base track is made of galvanized steel.

16. The elongated lighting track of claim 13, wherein the lighting track configured to substantially extend along the length of the longitudinal axis of the autorack.

17. The elongated lighting track of claim 13, wherein each base track comprises flat lower portions extending longitudinally along left and right sides of the base track and extending laterally towards the left and right sides of the autorack, the flat portions being configured to be attached to the deck floor of one of the decks of the autorack.

18. The elongated lighting track of claim 13, wherein each track segment has front and rear ends and further comprises front and rear caps attached to the front and rear ends respectively with openings configured to pass through electrical wires connected to the power bus of the track segment to connect the power bus to the power bus of an adjacent track segment.

19. The elongated lighting track of claim 13, wherein the adjacent ends of each pair of adjacent track segments are configured to be connected together and attached to the deck floor by a track connector that covers the electrical wires extending between the adjacent track segments.

20. The elongated lighting track of claim 13, wherein, for each terminal track segment, being a track segment having one end, being the terminal end, not adjacent to another track segment, the terminal end of the terminal track segment is configured to be covered by a terminal track connector that is attached to the deck floor.

* * * * *